(12) United States Patent
Chelmecki et al.

(10) Patent No.: US 11,985,196 B2
(45) Date of Patent: May 14, 2024

(54) SINGLE PAIR ETHERNET SENSOR DEVICE AND SENSOR NETWORK

(71) Applicant: Panduit Corp., Tinley Park, IL (US)

(72) Inventors: Christopher A. Chelmecki, Orland Park, IL (US); Abraham D. Fechter, Cameron Park, CA (US); Seok Man Han, Folsom, CA (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 18/123,381

(22) Filed: Mar. 20, 2023

(65) Prior Publication Data

US 2023/0231920 A1     Jul. 20, 2023

Related U.S. Application Data

(63) Continuation of application No. 17/510,678, filed on Oct. 26, 2021, now Pat. No. 11,622,006.

(Continued)

(51) Int. Cl.
*H04L 67/125*     (2022.01)
*H04L 12/10*      (2006.01)
(Continued)

(52) U.S. Cl.
CPC ............ *H04L 67/125* (2013.01); *H04L 12/10* (2013.01); *H04L 12/40045* (2013.01);
(Continued)

(58) Field of Classification Search
CPC ............ H04L 67/125; H04L 12/40045; H04L 61/4541
See application file for complete search history.

(56) References Cited

U.S. PATENT DOCUMENTS 7,676,280 B1 *  3/2010  Bash .................. H05K 7/20836
                                                    700/17
9,906,605 B2 *  2/2018  Nguyen .................. H04L 67/51
(Continued)

FOREIGN PATENT DOCUMENTS

WO      2017107187 A1    6/2017

OTHER PUBLICATIONS

Hahniche, Jorg, David D. Brandt, and Dayin Xu. "IEEE 802.3 cg (10SPE)-10 Mb/s Single Pair Ethernet meeting Industrial Automation objectives." ODVA 2017 Industry Conference & 18th Annual Meeting (2017), 14 pgs.

(Continued)

*Primary Examiner* — Jimmy H Tran
(74) *Attorney, Agent, or Firm* — Christopher S. Clancy; James H. Williams; Peter S. Lee

(57) ABSTRACT

A sensor device may include an environmental sensor configured to sense an environmental parameter and generate a signal representative thereof, a single pair ethernet (SPE) interface configured to cooperate with an SPE link, and a controller provided in communication with the environmental sensor and the SPE interface. The controller may be configured to receive the signal representative of the sensed environmental parameter and to control the SPE interface to generate at least one ethernet frame including data indicative of the sensed environmental parameter for transmission over the SPE link. The controller may be further configured to automatically configure communication with a remote server over the SPE link via the SPE interface.

20 Claims, 6 Drawing Sheets

Related U.S. Application Data

(60) Provisional application No. 63/109,468, filed on Nov. 4, 2020.

(51) Int. Cl.
  *H04L 12/40* (2006.01)
  *H04L 61/4511* (2022.01)
  *H04L 61/4541* (2022.01)
  *H04L 67/51* (2022.01)
  *H04L 67/55* (2022.01)
  *H04L 67/562* (2022.01)

(52) U.S. Cl.
  CPC ...... *H04L 61/4511* (2022.05); *H04L 61/4541* (2022.05); *H04L 67/51* (2022.05); *H04L 67/55* (2022.05); *H04L 67/562* (2022.05)

(56) References Cited

U.S. PATENT DOCUMENTS

| | | | | |
|---|---|---|---|---|
| 10,298,724 | B2* | 5/2019 | Albrecht | H04L 67/12 |
| 10,677,484 | B2* | 6/2020 | Ribbich | G05D 23/1934 |
| 10,959,067 | B1* | 3/2021 | Fang | H04W 4/38 |
| 11,451,610 | B1* | 9/2022 | Saunders | H04L 43/045 |
| 2010/0318819 | A1* | 12/2010 | Diab | H02J 1/08 |
| | | | | 713/300 |
| 2012/0319838 | A1* | 12/2012 | Ly | H04L 67/12 |
| | | | | 702/188 |
| 2015/0066979 | A1* | 3/2015 | Zhang | G06F 16/245 |
| | | | | 707/769 |
| 2016/0061477 | A1* | 3/2016 | Schultz | G06F 13/4221 |
| | | | | 700/276 |
| 2016/0365967 | A1* | 12/2016 | Tu | H04L 12/413 |
| 2018/0191666 | A1* | 7/2018 | Rahman | H04L 61/4541 |
| 2018/0323550 | A1* | 11/2018 | Brennan | H01R 24/64 |
| 2019/0058979 | A1* | 2/2019 | Stagg | H04W 4/029 |
| 2019/0097900 | A1* | 3/2019 | Rodriguez | G06F 11/1484 |
| 2019/0238349 | A1* | 8/2019 | Moffitt | H04L 12/10 |
| 2019/0349733 | A1* | 11/2019 | Nolan | H04W 84/22 |
| 2020/0052877 | A1* | 2/2020 | Tu | H04L 12/413 |
| 2020/0153174 | A1* | 5/2020 | Curtis | H01R 13/6272 |
| 2020/0195450 | A1* | 6/2020 | Bains | G06F 13/1668 |
| 2020/0233472 | A1* | 7/2020 | Jones | H03M 13/154 |
| 2020/0235780 | A1* | 7/2020 | Bains | H04B 3/23 |
| 2021/0082276 | A1* | 3/2021 | Martin | H04W 72/21 |
| 2021/0144877 | A1* | 5/2021 | Lessmann | H04L 12/46 |
| 2021/0218202 | A1* | 7/2021 | Curtis | H01R 13/7175 |
| 2021/0263545 | A1* | 8/2021 | Goergen | G05F 1/577 |
| 2021/0286748 | A1* | 9/2021 | Brychta | G06F 13/4068 |
| 2021/0306214 | A1* | 9/2021 | Lane | H04L 67/02 |
| 2021/0311797 | A1* | 10/2021 | Park | A47L 9/2857 |
| 2021/0341907 | A1* | 11/2021 | Fadul | G06F 13/20 |
| 2022/0103449 | A1* | 3/2022 | Guru | H02P 29/00 |
| 2022/0159427 | A1* | 5/2022 | Fang | H04W 88/085 |
| 2022/0337450 | A1* | 10/2022 | Walther | G01D 21/00 |
| 2023/0107324 | A1* | 4/2023 | Gerber | H01R 31/005 |
| | | | | 439/638 |
| 2023/0123088 | A1* | 4/2023 | Müller | H04L 12/66 |
| | | | | 370/401 |

OTHER PUBLICATIONS

Fuchs, Stefan, Alexander Gercikow, and Hans-Peter Schmidt. "Monitoring of real-time behavior of industrial ethernet for industry 4.0." 2017 International Electrical Engineering Congress (IEECON), IEEE (2017), 4 pgs.

Tukasik, Zbigniew, and Anton Ushakov. "Comparative analysis of data transmission technologies in industrial systems of the Internet of things (IoT)." Journal of Automation, Electronics and Electrical Engineering 2.1 (2020), pp. 31-39 (9 pgs.).

Lou, David Zhe, et al. "Industrial networking enabling IIoT communication." IIC: WHT: IN23: V1. 0: PB: Aug. 29, 2018 (2018), 16 pgs.

Osorio, Felipe Gabriel, et al. "Sensor network using power-over-ethernet." 2015 International Conference and Workshop on Computing and Communication (IEMCON). IEEE (2015), 7 pgs.

\* cited by examiner

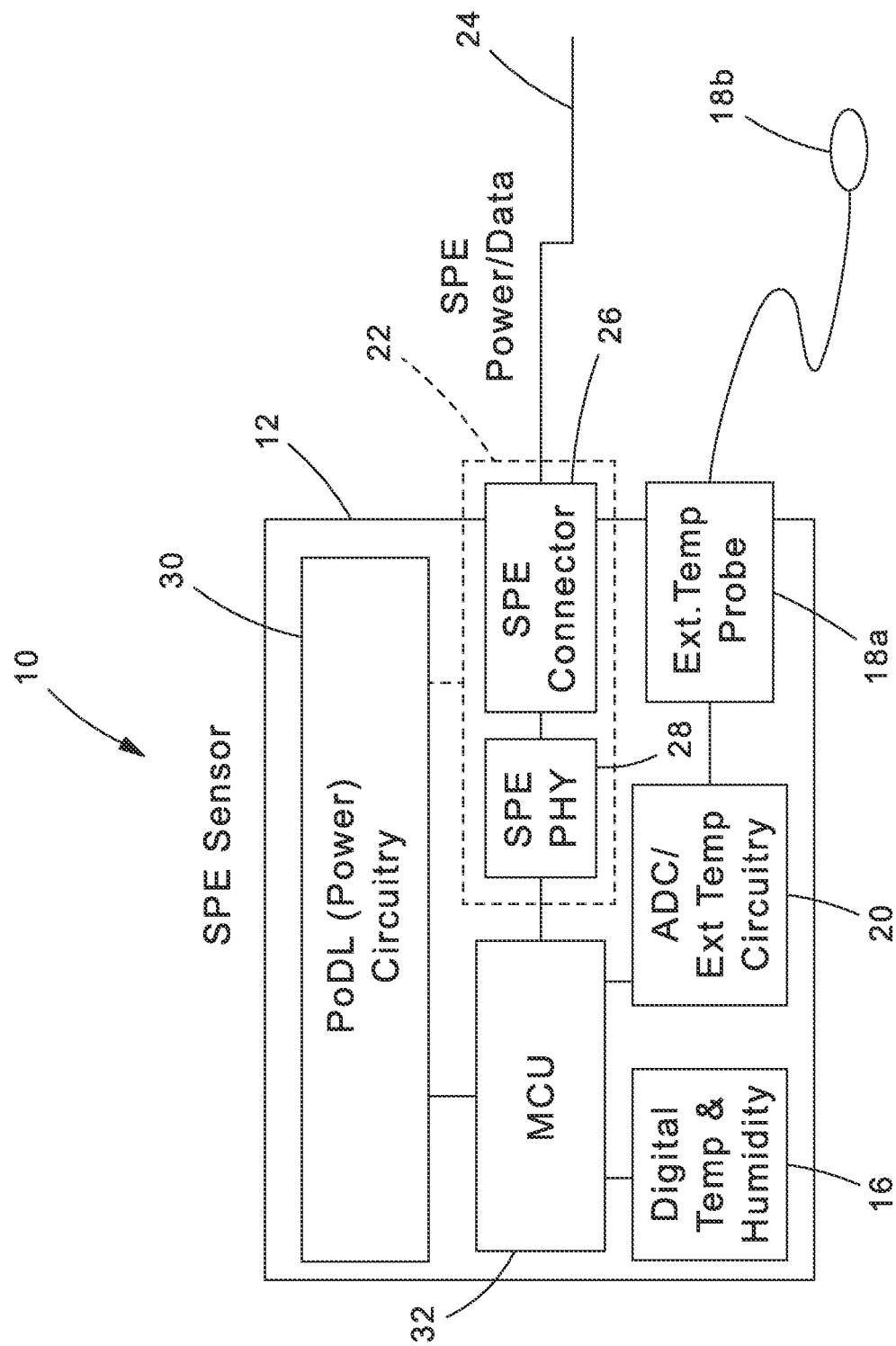

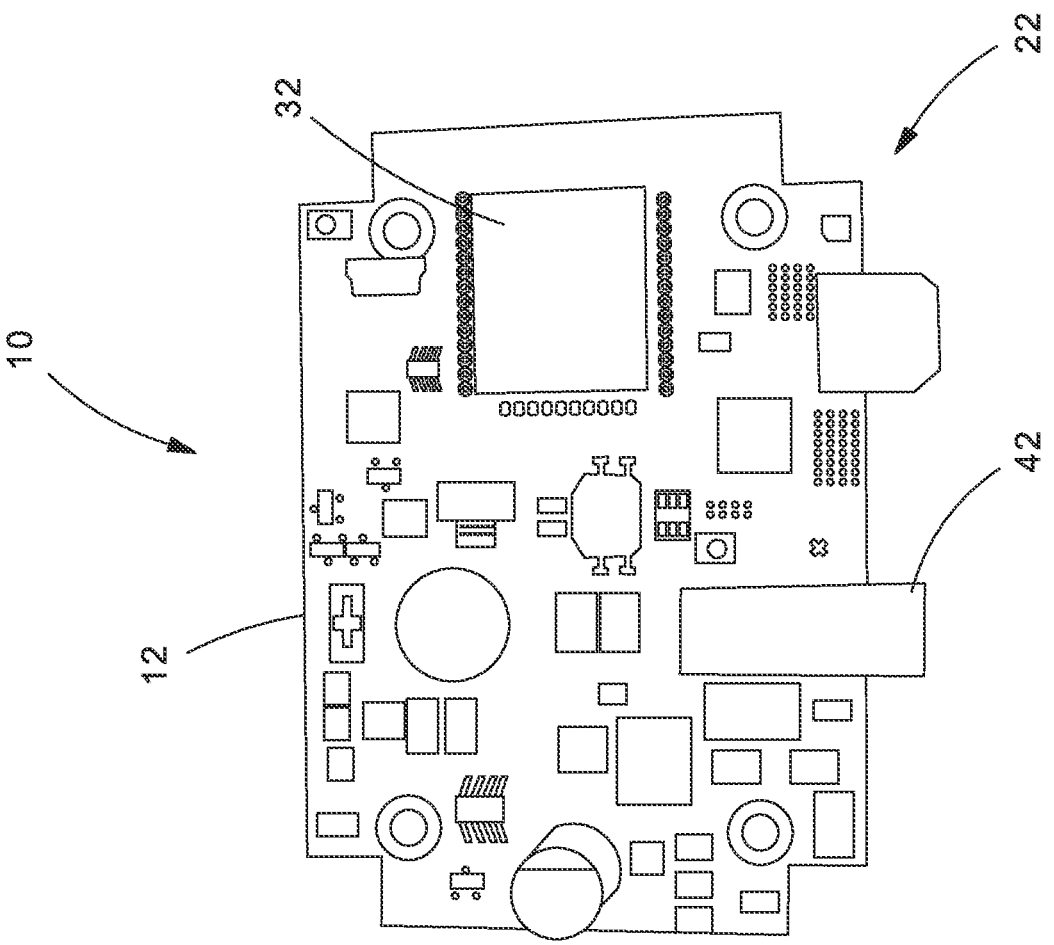
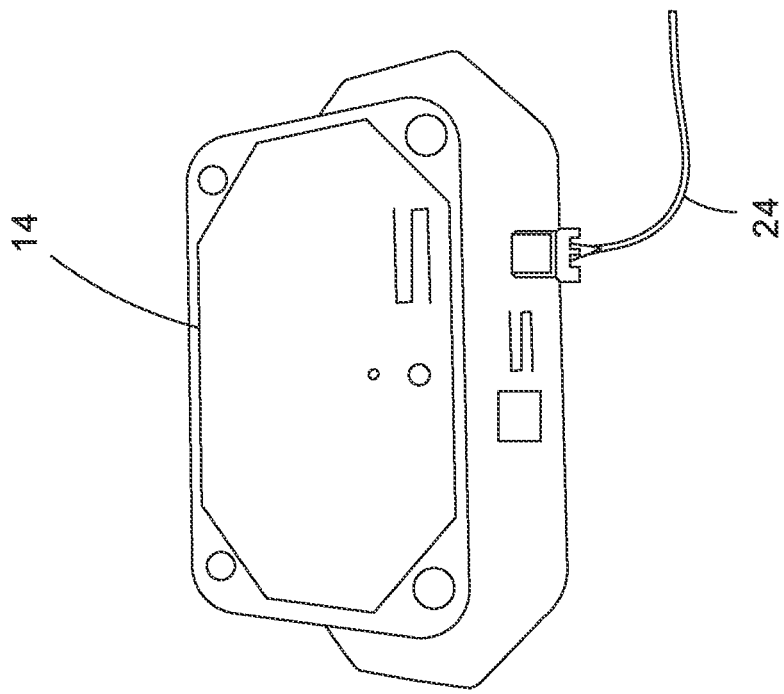

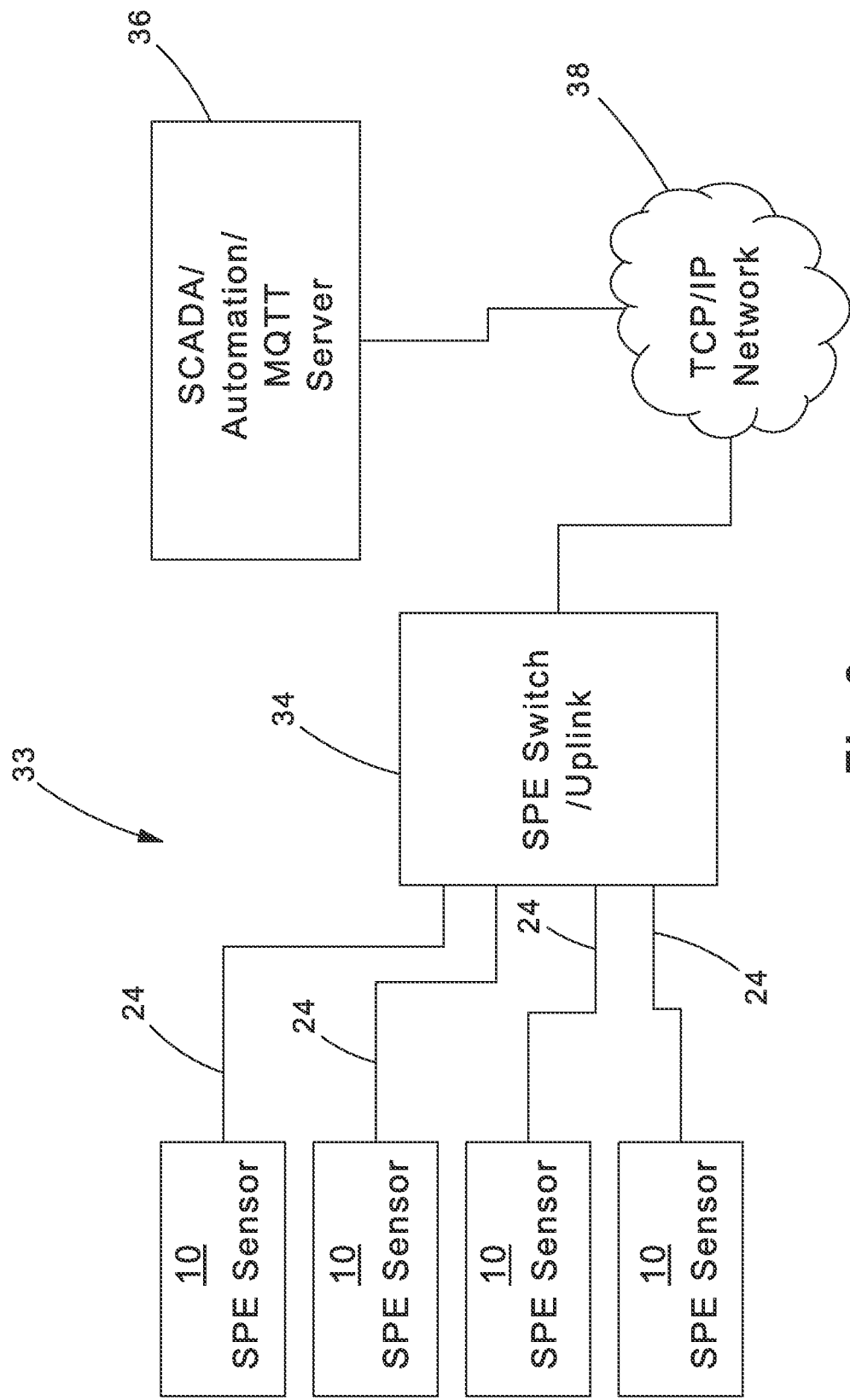

SINGLE PAIR ETHERNET SENSOR DEVICE AND SENSOR NETWORK

CROSS-REFERENCE TO RELATED APPLICATION(S)

This application is a continuation of U.S. Non-Provisional patent application Ser. No. 17/510,678, filed on Oct. 26, 2021, which claims benefit to U.S. Provisional Patent Application No. 63/109,468, filed on Nov. 4, 2020, the entirety of all of which are hereby incorporated by reference herein.

TECHNICAL FIELD

The following relates to a single pair ethernet (SPE) sensor device having an autoconfiguration mode and an SPE sensor network including such an SPE sensor device.

BACKGROUND

Single Pair Ethernet (SPE) is specified by the Institute of Electrical and Electronics Engineers (IEEE) 802.3cg standard as 10BASE-T1L or 10BASE-T1S. SPE may be utilized to replace and update existing proprietary wiring/protocols in various industries such as industrial/building automation and automotive/vehicle networks with an interface that provides forms of both power and data transmission (e.g., Ethernet). A single pair of conductors (in contrast to two pairs or four pairs of conductors for traditional Ethernet) reduces the cost of cabling and installation. For 10BASE-T1L, a data rate of 10 megabits/sec (MBS) is provided for bus lengths up to 1000 meters, with optional power delivery (i.e., power over data line (PoDL)). Alternatively, 10BASE-T1S provides for multidrop configurations up to 8 nodes but is limited to 25 meters of total bus length and does not include power delivery.

In that regard, a need exists in industrial and/or building automation for an improved industrial and/or building sensor and sensor network that both reduce cost and simplify deployment. Such an improved sensor and sensor network would utilize the IEEE 802.3cg SPE standard to lower the cost of cabling and to optionally provide for integrated power delivery. Such an improved sensor and sensor network would also simplify environmental sensing for industrial and/or building automation by being configurable to communicate directly with higher level automation protocols. Such an improved sensor and sensor network would still further simplify deployment by providing an auto, automatic, or zero-configuration mode to solve, eliminate, mitigate, overcome, and/or improve issues associated with manual configuration of industrial and/or building automation sensors and/or sensor networks.

SUMMARY

According to one non-limiting exemplary embodiment described herein, a sensor device is provided which may comprise an environmental sensor configured to sense an environmental parameter and generate a signal representative thereof, a single pair ethernet (SPE) interface configured to cooperate with an SPE link, and a controller provided in communication with the environmental sensor and the SPE interface. The controller may be configured to receive the signal representative of the sensed environmental parameter and to control the SPE interface to generate at least one ethernet frame comprising data indicative of the sensed environmental parameter for transmission over the SPE link. The controller may be further configured to automatically configure communication with a remote server over the SPE link via the SPE interface According to another non-limiting exemplary embodiment described herein, a sensor network is provided which may comprise a plurality of sensor devices, wherein each of the plurality of sensor devices comprises an environmental sensor configured to sense an environmental parameter and generate a signal representative thereof, a single pair ethernet (SPE) interface configured to cooperate with an SPE link, and a controller provided in communication with the environmental sensor and the SPE interface. The controller may be configured to receive the signal representative of the sensed environmental parameter and to control the SPE interface to generate at least one ethernet frame comprising data indicative of the sensed environmental parameter for transmission over the SPE link. The controller may be further configured to automatically configure communication with a remote server over the SPE link via the SPE interface. The sensor network may further comprise an SPE switch comprising a plurality of device switch ports and a server switch port, each of the plurality of device switch ports configured for communication with one of the plurality of sensor devices and the server switch port configured for communication with the remote server.

According to still another non-limiting exemplary embodiment described herein, a non-transitory computer readable storage medium is provided having stored computer executable instructions for controlling a sensor device which may have an environmental sensor and a single pair ethernet (SPE) interface configured to cooperate with an SPE link. The instructions when executed by a processor may cause the processor to receive a signal representative of a sensed environmental parameter, control the SPE interface to generate at least one ethernet frame comprising data indicative of the sensed environmental parameter for transmission over the SPE link, and automatically configure the sensor device for communication with a remote server over the SPE link via the SPE interface.

A detailed description of these and other non-limiting exemplary embodiments of a SPE sensor device having an autoconfiguration mode and an SPE sensor network including such an SPE sensor device is set forth below together with the accompanying drawings.

BRIEF DESCRIPTION OF THE DRAWINGS

FIG. 1 is a simplified block diagram of one non-limiting exemplary embodiment of a sensor device according to the present disclosure;

FIG. 2A is a perspective view of non-limiting exemplary embodiment of a circuit board for the sensor device of FIG. 1 according to the present disclosure;

FIG. 2B is a perspective view of non-limiting exemplary embodiment of a housing for the sensor device of FIG. 1 according to the present disclosure;

FIG. 3 is a simplified block diagram of one non-limiting exemplary embodiment of a sensor network configuration according to the present disclosure;

DETAILED DESCRIPTION

Figure 4:
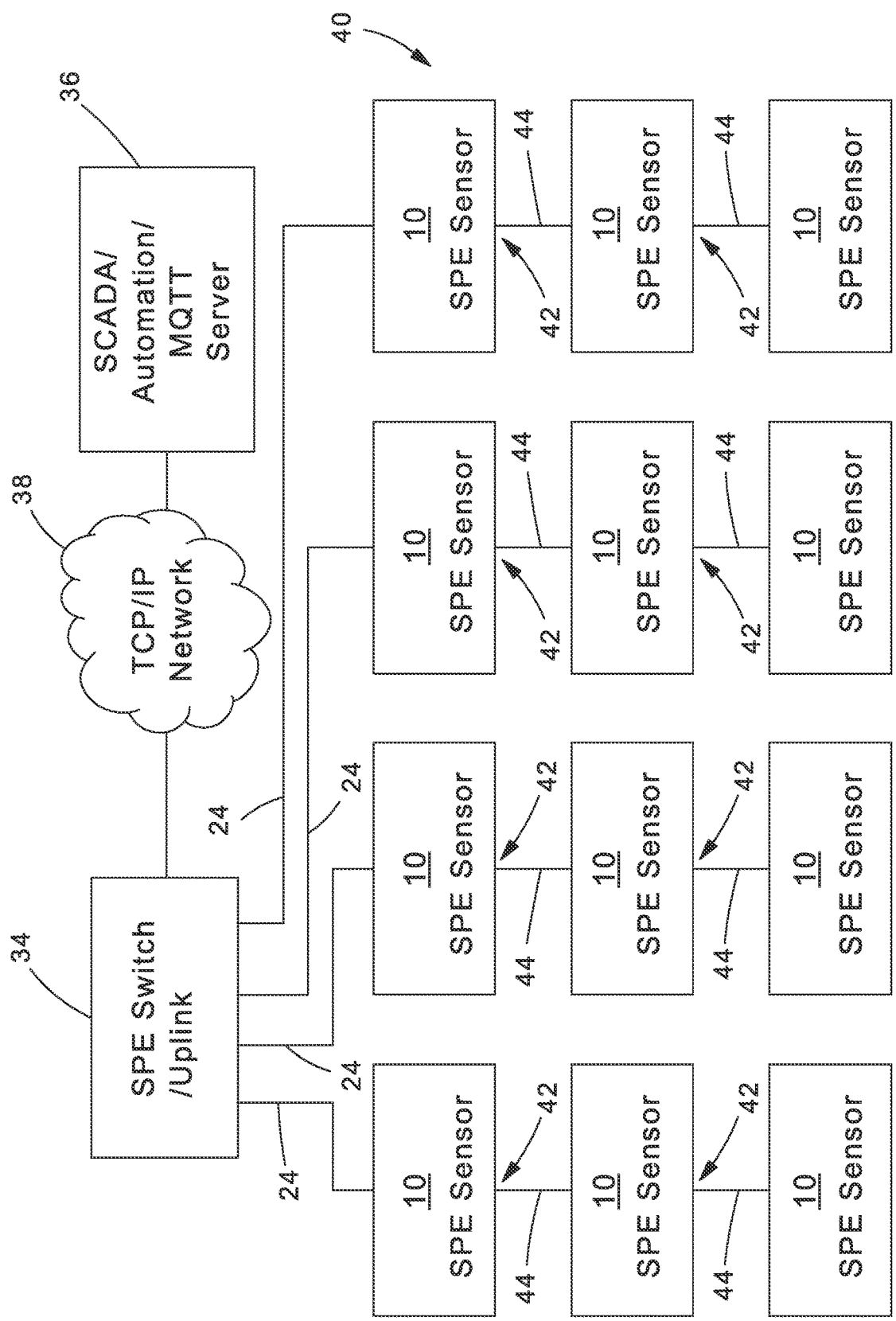
FIG. 4 is a simplified block diagram of another non-limiting exemplary embodiment of a sensor network configuration according to the present disclosure.

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

With reference to FIGS. 1-6, a more detailed description of non-limiting exemplary embodiments of a single pair ethernet (SPE) sensor device having an autoconfiguration mode and an SPE sensor network including such an SPE sensor device will be provided. For ease of illustration and to facilitate understanding, like reference numerals may be used herein for like components and features throughout the drawings.

As previously described, there exists a need in industrial and/or building automation for an improved industrial and/or building sensor and sensor network that would utilize the IEEE 802.3cg SPE standard to lower the cost of cabling and to optionally provide for integrated power. Such an improved sensor and sensor network would also simplify environmental sensing for industrial or building automation by being configurable to communicate directly with higher level automation protocols, and simplify deployment by providing an auto, automatic, or zero-configuration mode to solve, eliminate, mitigate, overcome, and/or improve issues associated with manual configuration of industrial and/or building automation sensors and/or sensor networks.

FIG. 1 is a simplified block diagram of one non-limiting exemplary embodiment of a sensor device according to the present disclosure. FIGS. 2A and 2B are perspective views of non-limiting exemplary embodiments of a circuit board and a housing for the sensor device of FIG. 1. As seen therein, an SPE sensor device 10 may generally comprise certain hardware, firmware, software, and/or electrical components on a printed circuit board (PCB) 12 surrounded by an enclosure 14, which may be configured to protect the SPE sensor device 10 according to environmental requirements.

More specifically, the SPE sensor device 10 may comprise one or more environmental sensors configured to sense an environmental parameter, such as a digital temperature and humidity sensor 16 of any known type configured to sense an ambient temperature and humidity and/or an external temperature probe 18a, 18b of any known type configured to sense a temperature associated with a process or a device proximate the SPE sensor device 10. The SPE sensor device 10 may additionally or alternatively comprise any other known type of environmental sensor or sensors configured to sense any type of environmental parameter.

The digital temperature and humidity sensor 16 may be configured to generate a digital signal representative of a sensed ambient temperature and humidity. The external temperature probe 18a, 18b may be configured to generate an analog signal representative of a sensed temperature associated with a process or a device. In that regard, the SPE sensor device 10 may further comprise any known type of analog-to-digital converter (ADC) 20, which may be provided as part of an integrated circuit (IC), and which may be provided in communication with the external temperature probe 18a, 18b for converting an analog signal generated by the external temperature probe 18a, 18b into a digital signal.

Referring still to FIGS. 1, 2A, and 2B, the SPE sensor device 10 may further comprise a 10BASE-T1L SPE interface 22 which may be configured to cooperate with an SPE link or cable link 24 configured to carry data included in ethernet protocol frames from or to the SPE interface 22 according to the 10BASE-T1L IEEE 802.3cg SPE standard previously described. In that regard, the SPE interface 22 may comprise an SPE connector 26 configured for attachment to the SPE link 24 and an SPE physical (PHY) layer component 28. The SPE PHY layer component 28 may comprise an integrated circuit (IC), such as manufactured by Analog Devices (e.g., ADIN1100), which may be part of a network interface controller and may be configured to connect a Medium Access Control (MAC) device to a physical medium such as SPE link 24. The SPE interface 22 may be configured to generate ethernet frames comprising data indicative of the environmental parameter sensed by the digital temperature and humidity sensor 16 and/or the external temperature probe 18a, 18b.

The SPE link 24 may also be configured to deliver electrical power to the SPE sensor device 10 according to the 10BASE-T1L IEEE 802.3cg SPE standard previously described, including up to 48-60 Volts and 50 Watts of power. In that regard, the SPE sensor device 10 may further comprise power over data line (PoDL) power circuitry 30, such as manufactured by Analog Devices. The PoDL power circuitry 30 may be provided in communication with the digital temperature and humidity sensor 16, the external temperature probe 18a, 18b, the ADC 20, and/or the SPE interface 22 and may be configured to supply electrical power to any or all thereof.

The SPE sensor device 10 may further comprise a controller 32, such as an ESP32 microcontroller manufactured by Espressiff Systems, which may comprise a low-power System-on-a-Chip (SoC) microcontroller and integrated WiFi (IEEE 802.11bgn) and/or Bluetooth (including Bluetooth Low Energy (BLE)) wireless communication capability, including one or more antennas and one or more wireless transceivers. Like the digital temperature and humidity sensor 16, the external temperature probe 18a, 18b, the ADC 20, and/or the SPE interface 22, the controller 32 may also be supplied with electrical power by the PoDL power circuitry 30 via SPE link 24 configured to deliver electrical power according to the 10BASE-T1L IEEE 802.3cg SPE standard previously described. The controller 32, as well as the digital temperature and humidity sensor 16, probe 18a, 18b, ADC 20, SPE interface 22, PoDL power circuitry 30, and any other controllers, units, modules, switches, networks, servers, systems, subsystems, components, interfaces, sensors, probes, converters, devices, circuitry, hardware, or the like described herein, may (individually or collectively) comprise circuitry (which may include an integrated circuit (IC)) such as one or more appropriately programmed processors (e.g., one or more microprocessors including central processing units (CPU)) and an associated computer readable storage medium or media, which may include stored computer executable instructions such as operating system software, firmware, and/or application software executable by the processor(s) for controlling operation thereof and/or for performing the particular algorithm or algorithms represented by the various functions and/or operations described herein, including interaction and/or cooperation between any software, firmware, modules, controllers, units, modules, switches, networks, servers, systems, subsystems, components, interfaces, sensors, probes, converters, devices, circuitry, hardware, or the like described herein.

Referring now to FIGS. 3 and 4, simplified block diagrams of non-limiting exemplary embodiments of sensor network configurations according to the present disclosure are shown. More specifically, FIG. 3 illustrates a sensor network configuration 33 which may comprise a plurality of SPE sensor devices 10 connected via SPE links 24 to an SPE switch/uplink 34 in a star-based 1:1 device-to-switch-port configuration. It should be noted that the sensor network 33 may be configured to include 10BASE-T1L power delivery. The SPE switch/uplink 34 may be provided in communication with a remote server 36 (or servers) via a network 38 which may comprise a Transmission Control Protocol/Internet Protocol (TCP/IP) network, such as the Internet and/or any other TCP/IP network. In that regard, the remote server (or servers) may comprise a Supervisory Control and Data Acquisition (SCADA) server, an Automation server, a Message Queuing Telemetry Transport (MQTT) server, and/or any other similar type of server or similarly configured server.

FIG. 4 illustrates another star-based sensor network 40 which is configured to comprise SPE sensor devices 10 configured to support daisy-chaining to other SPE sensor devices 10. In that regard, each of the chained SPE sensor devices 10 comprises an integrated store-and-forward switch with two external ports, including a port 42 configured for communication via an SPE link 44 with another SPE sensor device 10 (i.e., an additional node). Such a daisy-chained configuration significantly reduces costs associated with both SPE switch/uplink 34 and cabling links 24, 44 in applications or environments where many SPE sensor devices 10 are required. It should be noted that the daisy-chain configuration shown in FIG. 4 may include daisy-chain 10BASE-T1L power delivery. As seen in FIG. 4, the SPE switch/uplink 34 may again be provided in communication with a remote server 36 (or servers) via a network 38 which may comprise a TCP/IP network, such as the Internet and/or any other TCP/IP network. The remote server 36 (or servers) may again comprise a SCADA server, an Automation server, an MQTT server, and/or any other similar type of server or similarly configured server.

In that regard, as those of ordinary skill in the art will understand, the remote server 36 (or servers) shown in FIGS. 3 and 4 may comprise one or more appropriately programmed processors (e.g., one or more microprocessors including central processing units (CPU)) and an associated computer readable storage medium or media, which may include stored computer executable instructions such as operating system software, firmware, and/or application software executable by the processor(s) for controlling operation thereof and/or for performing the particular algorithm or algorithms represented by the various functions and/or operations described herein, including interaction and/or cooperation between any software, firmware, modules, controllers, units, modules, switches, networks, servers, systems, subsystems, components, interfaces, sensors, probes, converters, devices, circuitry, hardware, or the like described herein.

Still referring to FIGS. 3 and 4, and with continuing reference to FIG. 1, the controller 32 of an SPE sensor device 10 may be configured to control operation of the SPE sensor device 10, including its various components, based on stored firmware programmed into the controller 32 during production, which firmware may be based on an open source C implementation of the Open Platform Communications Unified Architecture (OPC-UA) machine-to-machine communication protocol for industrial automation based on client-server communication for data collection and control, such as Open62541, and which may include and/or utilize ESP32 Internet-of-Things (IoT) Development Framework (IDF) libraries. In that regard, the firmware may provide functionality to initialize and/or control the SPE sensor device 10, including the controller 32 (e.g., an ESP32 microcontroller), the SPE PHY layer component 28, the digital temperature and humidity sensor 16, the external temperature probe 18a, 18b, the ADC 20, and/or the PoDL power circuitry 30. The firmware may also provide functionality to negotiate an Internet Protocol (IP) address for the SPE sensor device 10 using Dynamic Host Configuration Protocol (DHCP) whereby a DHCP server dynamically assigns and IP address to the SPE sensor device 10. The firmware may still further provide functionality to control measurement and/or sensing of environmental parameters by the digital temperature and humidity sensor 16 and/or the external temperature probe 18, provide data representing such sensed environmental parameters to SCADA and/or Automation Internet-of-Things (IoT) software, and autoconfigure network communications of the SPE sensor device 10 with a remote server 36 over the network 38.

More specifically, stored firmware programmed into the controller 32 of an SPE sensor device 10 of the present disclosure may be executable by the controller 32 to cause the controller 32 to provide zero configuration of the SPE sensor device 10 according to Message Queuing Telemetry Transport (MQTT) publish-subscribe network protocol for transporting messages between devices. In that regard, existing MQTT devices have permanently stored therein an IP address of an MQTT server to enable communications with that server over the Internet, or such MQTT devices provide a web browser for manual configuration of the MQTT device to communicate with an MQTT server. However, in an SPE sensor device 10 according to the present disclosure, the firmware of the controller 32 provides functionality such that neither a connection to the cloud nor manual configuration are required.

In that regard, the stored firmware programmed into the controller 32 of an SPE sensor device 10 may provide such zero configuration for MQTT publishing using multicast Domain Name Service (mDNS) protocol to thereby enable MQTT publisher autoconfiguration. In general, mDNS enables Domain Name Service (DNS) without using a server that stores device names and their associated IP addresses. With mDNS, a client sends a multicast message asking a host with a particular name to identify itself, the host responds with its IP address, and the client stores the name and associated IP address of that host.

The stored firmware programmed into the controller 32 of an SPE sensor device 10 implements the standard pattern for use of mDNS. More specifically, the controller 32 uses mDNS, and in some embodiments in concert with DNS-SD, to request notification from any MQTT brokers, such as remote server 36. Any servers with mDNS responders configured to advertise an MQTT broker, such as remote server 36, respond with their name and IP address. The controller 32 of the SPE sensor device 10 then stores the name and IP address of the broker, such as server 36, and thereafter automatically publishes new data from the digital temperature and humidity sensor 16 and/or probe 18a, 18b to the broker, such as remote server 36. It should be noted that the MQTT discovery service described is a one-time service. However, in the event that a switch to a different MQTT broker is desired or needed, such as if the previously identified MQTT broker goes down, the MQTT discovery service described could be repeated.

Figure 5:
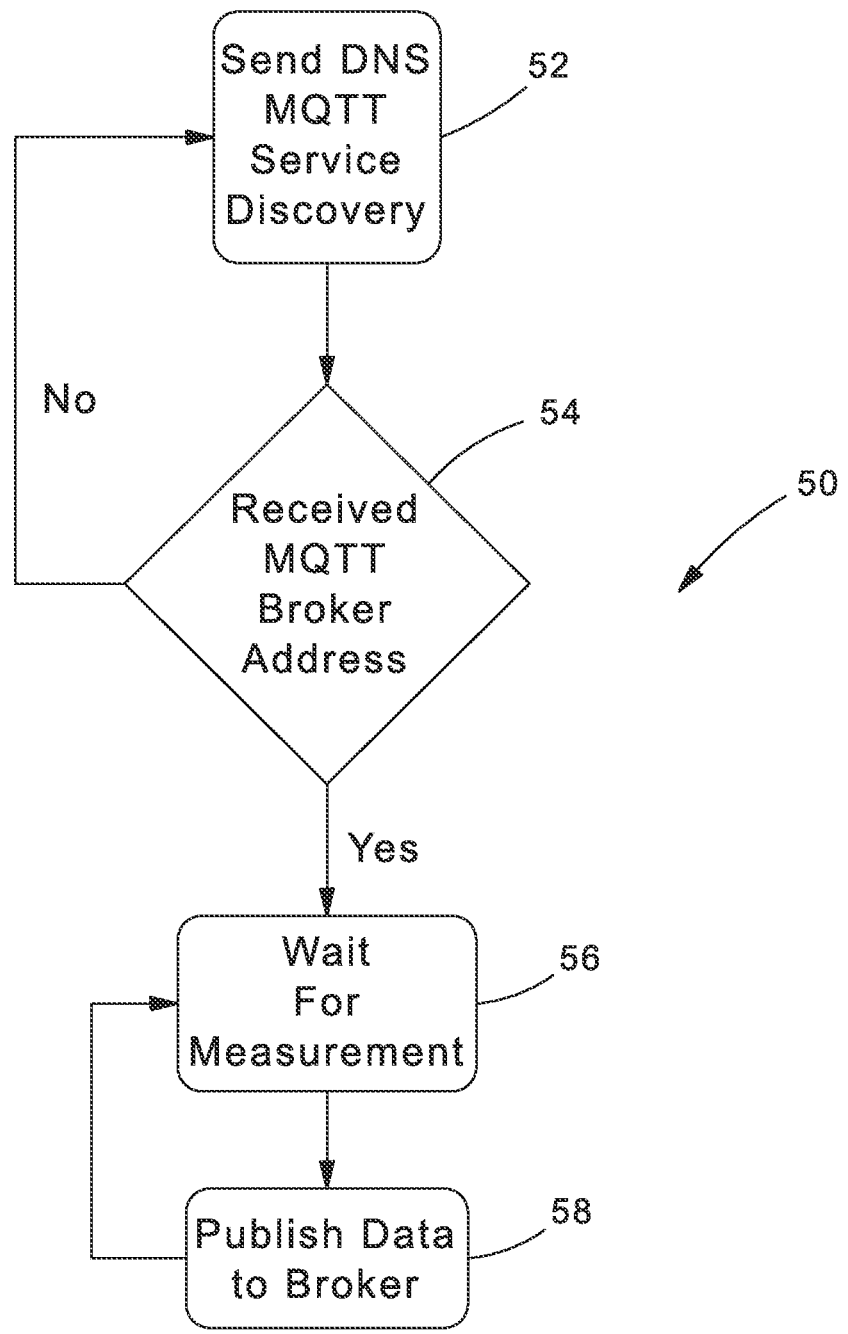
FIG. 5 is a simplified flowchart for a non-limiting exemplary embodiment of an autoconfiguration protocol for a sensor device and/or a sensor network according to the present disclosure.

In that regard, FIG. 5 is a simplified flowchart 50 for a non-limiting exemplary embodiment of an autoconfiguration protocol for a sensor device and/or a sensor network according to the present disclosure. As seen therein, and with continuing reference to FIGS. 1, 3 and 4, the mDNS MQTT publisher zero configuration or autoconfiguration of an SPE sensor device 10 and/or network 33, 40 as previously described is shown. More specifically, executing its stored firmware, the controller 32 of an SPE sensor device 10 is configured to send 52 an mDNS MQTT service discovery message. Thereafter, a determination is made by the controller 32 as to whether an MQTT broker address has been received 54 by the SPE sensor device 10. If not, the controller 32 is configured to again send 52 an mDNS MQTT service discovery message. Otherwise, if an MQTT broker address has been received 54 by the SPE sensor device 10, the controller 32 stores that address and is configured to then wait 56 for a measurement by the digital temperature and humidity sensor 16 and/or probe 18a, 18b. Upon receipt of such a measurement, the controller 32 is configured to publish 58 data representing such a measurement to the MQTT broker using the previously stored address of that broker. After having published 58 such data, the controller 32 is configured to again wait 56 for a new measurement by the digital temperature and humidity sensor 16 and/or probe 18a, 18b and thereafter publish 58 data representing such a new measurement to the MQTT broker.

Referring again to FIGS. 3 and 4, the stored firmware programmed into the controller 32 of an SPE sensor device 10 may also or alternatively provide functionality for zero configuration of the SPE sensor device 10 for communication with an OPC-UA server, such as remote server 36. For OPC-UA, the controller 32 may be configured to execute, implement, utilize, or follow the standard discovery mechanism specified by the OPC-UA foundation for Local Discovery Server with Multicast Extension (LDS-ME) by which a client is able to find an available UA server to which it may connect. More specifically, the SPE sensor device 10 may announce via mDNS that it provides an OPC-UA server. The OPC Local Discovery Server (LDS) then registers the SPE sensor device 10 and provides it to any OPC-UA clients that request it.

Figure 6:
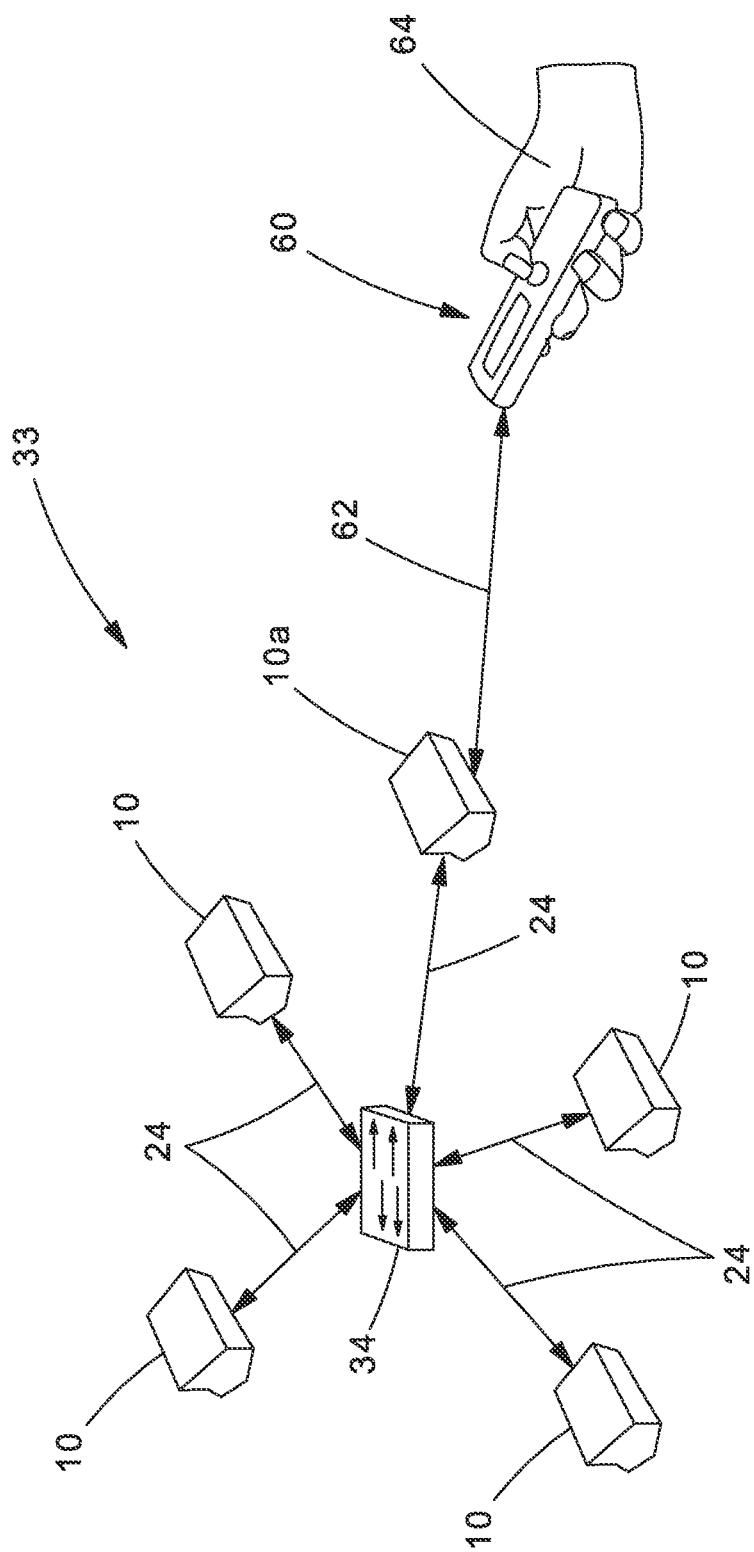
FIG. 6 is a simplified block diagram for a non-limiting exemplary embodiment of an autoconfiguration protocol for a sensor device and/or a sensor network according to the present disclosure.

Referring now to FIG. 6, a simplified block diagram for a non-limiting exemplary embodiment of an autoconfiguration protocol for a sensor device and/or a sensor network according to the present disclosure is shown. In that regard, however, and with continuing reference to FIG. 1, it should first be noted that the stored firmware programmed into the controller 32 of an SPE sensor device 10 may also provide functionality for manual direct-to-device wireless configuration. More specifically, the controller 32 may be configured to enable manual device configuration of an SPE sensor device 10a wirelessly using Bluetooth or Wi-Fi capability associated with the controller 32 as previously described. For Bluetooth, a laptop or mobile device 60 may be configured with a software application to wirelessly connect 62 to the SPE sensor device 10a and allow a user 64 to manually configure the SPE sensor device 10a or to view real-time measurement data provided by the digital temperature and humidity sensor 16 and/or the probe 18a, 18b. For Wi-Fi, the controller 32 of the SPE sensor device 10a would be configured to configure itself (i.e., the SPE sensor device 10a) as a Wi-Fi access point. The laptop or mobile device 60 may be configured to wirelessly connect 62 to the SPE sensor device 10a acting as a Wi-Fi access point.

The laptop or mobile device 60 may also be configured with a software application or access an embedded Web User Interface (WebUI) to allow a user 64 to manually configure the SPE sensor device 10a or to view real-time measurement data provided by the digital temperature and humidity sensor 16 and/or the probe 18a, 18b. In that regard, the controller 32 of the SPE sensor device 10a may contain an embedded webserver which uses standard web technology to provide a user interface to view measurements and to allow manual device configuration for use cases for the SPE sensor device 10a that are not covered by autoconfiguration methods.

Still referring to FIG. 6, and with continuing reference to FIG. 1, the stored firmware programmed into the controller 32 of an SPE sensor device 10a may also provide functionality for single point local configuration of multiple SPE sensor devices 10 in a network 33. In general, single point local configuration would enable manual and/or automatic device configuration of a plurality of SPE sensor devices 10 through a single SPE sensor device 10a. That is, single point local configuration functionality may provide a bulk configuration interface through a single SPE sensor device 10a.

More specifically, a user controlling the laptop or mobile device 60 may connect to one SPE sensor device 10a among a plurality of SPE sensor devices 10 in a network 33. Such a connection may be implemented either through the SPE sensor network 33 or using the direct-to-device wireless feature previously described. The WebUI or software application previously described may be configured to provide a bulk configuration option to enable the user controlling the laptop or mobile device 60 to configure multiple SPE sensor devices 10. In that regard, the controller 32 of the SPE sensor device 10a receiving a new or selected device configuration (e.g., manually) may be configured to use mDNS to automatically identify all other local SPE sensor devices 10 on the network 33 and to automatically push the new or selected device configuration over the network 33 to one or more of such local SPE sensor devices 10 selected or designated for configuration according to the new or selected device configuration. As well, each controller 32 of each such selected or designated SPE sensor device 10 may be configured to automatically configure that SPE sensor device 10 according to the selected or new device configuration.

Thus, as seen in FIG. 6, because the SPE sensor devices 10, 10a are configured for communication with each other over the network 33 (e.g., via SPE switch/uplink 34), a user 64 may configure multiple or all SPE sensor devices 10, 10a on a network 33 through a single SPE sensor device 10a configured to act as a bulk configuration interface. In that regard, the user 64 may connect to the single SPE sensor device 10a wirelessly in the fashion or fashions previously described, or may alternatively connect to the single SPE sensor device 10a over a wired connection and again utilize a WebUI as previously described to perform the single point local configuration as described herein. In such a fashion, the present SPE sensor devices 10 and sensor network 33 are configured to provide flexibility to enable different types of device and network configurations.

As is readily apparent, the improved SPE sensor device 10 and sensor networks 33, 40 of the present disclosure enable information technology (IT) personnel to support overall IT infrastructure and the expanding array of services connected through IT systems at traditional enterprise locations, such as manufacturing plants, distribution warehouses, and office buildings. Moreover, the improved SPE sensor device 10 and sensor networks 33, 40 of the present disclosure enable and improve applications such as monitoring temperature within equipment enclosures in industrial and enterprise IT applications, throughout warehouses, and in systems which currently make use of analog or digital wired sensors connected through proprietary Building Automation and Control network (BACnet) communication protocol and other gateways.

The present disclosure thus describes a single pair ethernet (SPE) sensor device 10 having an autoconfiguration mode and SPE sensor networks 33, 40 including such an SPE sensor device 10. The improved SPE sensor device 10 and sensor networks 33, 40 described utilize the IEEE 802.3cg SPE standard to lower the cost of cabling and to optionally provide for integrated power delivery. The improved SPE sensor device 10 and sensor networks 33, 40 of the present disclosure simplify environmental sensing for industrial or building automation by being configurable to communicate directly with higher level automation protocols, and simplify deployment by providing an auto, automatic, or zero-configuration mode to solve, eliminate, mitigate, overcome, and/or improve issues associated with manual configuration of industrial and/or building automation sensors and/or sensor networks.

As is readily apparent from the foregoing, various non-limiting embodiments of a single pair ethernet (SPE) sensor device 10 having an autoconfiguration mode and SPE sensor networks 33, 40 including such an SPE sensor device 10 have been described. While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A sensor device comprising:
   an environmental sensor configured to sense an environmental parameter and generate a signal representative thereof;
   a single pair ethernet (SPE) interface configured to cooperate with an SPE link;
   a communication interface configured to communicate with a remote device to receive a configuration command from the remote device; and
   a controller provided in communication with the environmental sensor and the SPE interface, wherein the controller is configured to:
      receive the signal representative of the sensed environmental parameter; and
      control the SPE interface to communicate data corresponding to the sensed environmental parameter for transmission over the SPE link based on information included in the received signal;
      control at least one configuration of the sensor device based on selected configuration instructions included in the configuration command received from the remote device; and
      communicate, via the communication interface, the selected configuration instructions to a second sensor device, the second sensor device configured to automatically configure at least one configuration of the second sensor device according to the selected configuration instructions.

2. The sensor device of claim 1, wherein the controller is configured to:
   control the SPE interface to generate at least one ethernet frame comprising the data corresponding to the sensed environmental parameter for transmission over the SPE link.

3. The sensor device of claim 1, wherein the controller is further configured to:
   communicate with a remote server over the SPE link via the SPE interface.

4. The sensor device of claim 1, wherein the environmental sensor comprises at least one of a temperature sensor such that the environmental parameter is a temperature reading or a humidity sensor such that the environmental parameter is a humidity reading.

5. The sensor device of claim 1, wherein the controller is configured to:
   enable the sensor device to communicate with a remote server according to a communication protocol.

6. The sensor device of claim 1, wherein the controller is configured to:
   generate and transmit a multicast Domain Name System (mDNS) MQTT service discovery request via the SPE interface;
   receive, via the SPE interface, and store an address of an MQTT broker;
   store the address of the MQTT broker; and
   transmit the data corresponding to the sensed environmental parameter to the MQTT broker via the SPE interface.

7. The sensor device of claim 1, wherein the controller is configured to:
   communicate with a remote server according to an Open Platform Communications Unified Architecture (OPC-UA) communication protocol or a Message Queuing Telemetry Transport (MQTT) protocol.

8. The sensor device of claim 1, further comprising:
   a power over data line (PoDL) circuitry, wherein the SPE interface and the SPE link are configured for PoDL delivery of electrical power via the PoDL circuitry.

9. The sensor device of claim 1, further comprising:
   a wireless transceiver, wherein the controller is configured for wireless communication with a remote device via the wireless transceiver to enable a user of the remote device to manually configure a remote sensor device or view sensed environmental parameter data via a user interface.

10. The sensor device of claim 1, further comprising:
    a store-and-forward switch; and
    an external port configured for communication with a second sensor device via a second SPE link in a daisy-chained configuration.

11. A sensor network comprising:
    a plurality of sensor devices, wherein each of the plurality of sensor devices comprises:
       an environmental sensor configured to sense an environmental parameter and generate a signal representative thereof;
       a single pair ethernet (SPE) interface configured to cooperate with an SPE link;
       a communication interface configured to communicate with a remote device to receive a configuration command from the remote device; and
       a controller provided in communication with the environmental sensor and the SPE interface, wherein the controller is configured to:
          receive the signal representative of the sensed environmental parameter; and control the SPE interface based on information included in the received signal control at least one configuration of the sensor device based on selected configuration instructions included in the configuration command received from the remote device; and communicate, via the communication interface, the selected configuration instructions to a second sensor device included in the plurality of sensor devices, the second sensor device configured to automatically configure at least one configuration of the second sensor device according to the selected configuration instructions.

12. The sensor network of claim 11, further comprising: an SPE switch comprising a plurality of device switch ports and a server switch port, each of the plurality of device switch ports configured for communication with one of the plurality of sensor devices and the server switch port configured for communication with a remote server.

13. The sensor network of claim 11, wherein the controller is configured to:

control the SPE interface to generate at least one ethernet frame comprising data indicative of the sensed environmental parameter for transmission over the SPE link.

14. The sensor network of claim 11, wherein the controller is further configured to:

communicate with a remote server over the SPE link via the SPE interface.

15. The sensor network of claim 11, wherein the controller of each one of the plurality of sensor devices is configured to enable communication with a remote server according to communication protocol.

16. The sensor network of claim 11, wherein the controller of each one of the plurality of sensor devices is configured to:

configure communication with a remote server according to an Open Platform Communications Unified Architecture (OPC-UA) communication protocol or a Message Queuing Telemetry Transport (MQTT) protocol.

17. The sensor network of claim 11, wherein the controller of each one of the plurality of sensor devices further comprises:

a power over data line (PoDL) circuitry, wherein the SPE interface of each one of the plurality of sensor devices and the SPE links are configured for PoDL delivery of electrical power via the PoDL circuitry.

18. The sensor network of claim 11, wherein the controller is configured to communicate with the second sensor device via an SPE switch configured to route communication to the plurality of sensor devices.

19. A non-transitory computer readable storage medium having stored computer executable instructions for controlling a sensor device having an environmental sensor a communication interface, and a single pair ethernet (SPE) interface configured to cooperate with an SPE link, wherein the instructions when executed by a processor cause the processor to:

receive a signal representative of a sensed environmental parameter;

control the SPE interface to communicate data indicative of the sensed environmental parameter for transmission over the SPE link;

configure the sensor device to communicate with a remote server over the SPE link via the SPE interface;

control at least one configuration of the sensor device based on selected configuration instructions included in a configuration command received from a remote device via the communication interface; and communicate, via the communication interface, the selected configuration instructions to a second sensor device, the second sensor device configured to automatically configure at least one configuration of the second sensor device according to the selected configuration instructions.

20. The non-transitory computer readable storage medium of claim 19, wherein the stored computer executable instructions cause the processor to:

enable the sensor device for communication with the remote server according to a communication protocol.

* * * * *